(12) United States Patent
Pettersson et al.

(10) Patent No.: US 9,143,810 B2
(45) Date of Patent: Sep. 22, 2015

(54) METHOD FOR MANUALLY OPTIMIZING JITTER, DELAY AND SYNCH LEVELS IN AUDIO-VIDEO TRANSMISSION

(75) Inventors: Martin Pettersson, Vallentuna (SE); Bo Burman, Upplands Vasby (SE); Mats Folkesson, Taby (SE); Valentin Kulyk, Taby (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 439 days.

(21) Appl. No.: 12/921,439

(22) PCT Filed: Mar. 13, 2008

(86) PCT No.: PCT/SE2008/050280
§ 371 (c)(1),
(2), (4) Date: Sep. 8, 2010

(87) PCT Pub. No.: WO2009/113926
PCT Pub. Date: Sep. 17, 2009

(65) Prior Publication Data
US 2011/0010625 A1    Jan. 13, 2011

(51) Int. Cl.
*G06F 3/048* (2013.01)
*H04N 21/234* (2011.01)
*G06F 3/0484* (2013.01)
*H04J 3/06* (2006.01)
*H04L 1/00* (2006.01)
(Continued)

(52) U.S. Cl.
CPC ...... *H04N 21/23406* (2013.01); *G06F 3/04847* (2013.01); *H04J 3/0632* (2013.01); *H04L 1/0022* (2013.01); *H04L 1/1838* (2013.01); *H04L 47/10* (2013.01); *H04L 47/12* (2013.01); *H04L 47/14* (2013.01); *H04L 47/2416* (2013.01); *H04L 47/283* (2013.01); *H04L 49/90* (2013.01); *H04L 65/80* (2013.01); *H04N 21/2368* (2013.01); *H04N 21/4307* (2013.01); *H04N 21/4341* (2013.01); *H04N 21/44004* (2013.01); *H04N 21/485* (2013.01)

(58) Field of Classification Search
CPC ..... H04L 47/10; H04L 47/283; H04L 43/087; G06F 5/06; G06F 3/04847; H04N 21/23406
USPC ............... 715/716, 833; 710/52; 345/545
See application file for complete search history.

(56) References Cited

U.S. PATENT DOCUMENTS

| | | | |
|---|---|---|---|
| 5,623,483 A | 4/1997 | Agrawal et al. | |
| 5,652,627 A | 7/1997 | Allen | |
| 6,750,897 B1* | 6/2004 | Moshrefi et al. | 348/14.08 |
| 7,212,247 B2* | 5/2007 | Albean | 348/515 |

(Continued)

FOREIGN PATENT DOCUMENTS

| | | |
|---|---|---|
| EP | 1146678 A1 | 10/2001 |
| WO | 2007/018576 A1 | 2/2007 |

*Primary Examiner* — Steven Sax
*Assistant Examiner* — Christopher J Fibbi
(74) *Attorney, Agent, or Firm* — Coats & Bennett, P.L.L.C.

(57) ABSTRACT

A communication device and method provide selective control of a level of buffering of at least one data stream. The communication device includes a jitter buffer (202), a jitter buffer control unit (204) and a user interface (206). An instruction received via an input to a user interface (206) indicates a jitter buffer strategy (510), such as enabling a jitter buffer or setting a size of a jitter buffer, based on the user input. The control unit (204) sets the buffer strategy based in the instruction, and a data stream transmitted via a packet-switched network is received (530) and buffered for play out based on the buffer strategy (540).

11 Claims, 5 Drawing Sheets

(51) Int. Cl.
*H04L 1/18* (2006.01)
*H04L 12/801* (2013.01)
*H04L 12/853* (2013.01)
*H04L 12/841* (2013.01)
*H04L 12/861* (2013.01)
*H04N 21/2368* (2011.01)
*H04N 21/43* (2011.01)
*H04N 21/434* (2011.01)
*H04N 21/44* (2011.01)
*H04N 21/485* (2011.01)
*H04L 29/06* (2006.01)

(56) References Cited

U.S. PATENT DOCUMENTS

| | | | |
|---|---|---|---|
| 7,685,616 B2 * | 3/2010 | Virdi et al. | 725/38 |
| 7,817,557 B2 * | 10/2010 | Woodworth | 370/236 |
| 2002/0199185 A1 * | 12/2002 | Kaminski et al. | 725/25 |
| 2004/0228327 A1 * | 11/2004 | Punjabi et al. | 370/352 |
| 2005/0226233 A1 | 10/2005 | Kryuchkov et al. | |
| 2006/0088000 A1 | 4/2006 | Hannu et al. | |
| 2006/0095612 A1 * | 5/2006 | FitzGerald | 710/52 |
| 2007/0081562 A1 * | 4/2007 | Ma | 370/516 |
| 2008/0192732 A1 * | 8/2008 | Riley et al. | 370/352 |
| 2009/0169179 A1 * | 7/2009 | Johnson | 386/124 |

* cited by examiner

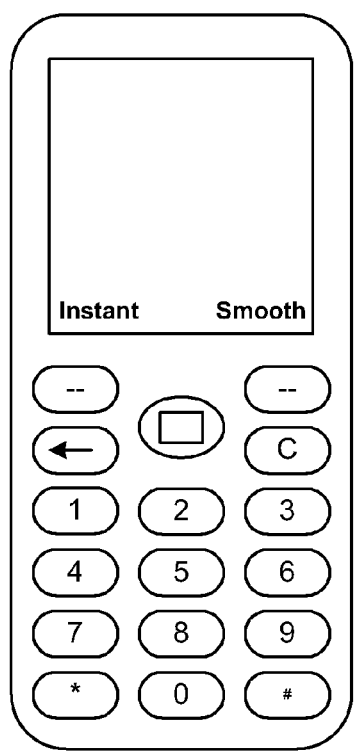 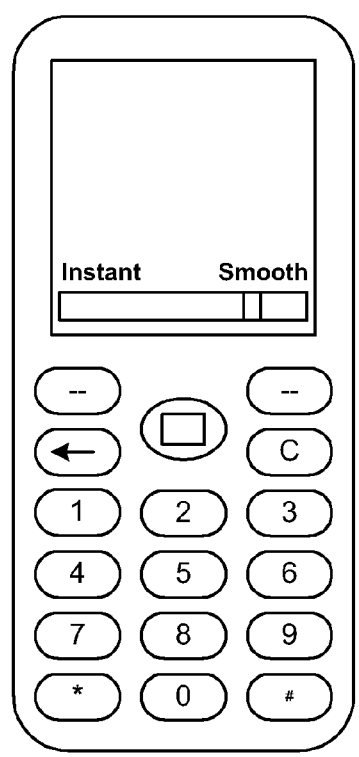
FIG. 4a    FIG. 4b

METHOD FOR MANUALLY OPTIMIZING JITTER, DELAY AND SYNCH LEVELS IN AUDIO-VIDEO TRANSMISSION

FIELD OF THE INVENTION

The present invention relates to a system and method for reproducing transmitted audio and/or video information, and more particularly, to a method and system including a selectable amount of delay, out-of-synch and/or delay jitter for reproducing audio-video information.

BACKGROUND

Sending "realtime" or "live" audio and/or video, and other media over a network involves a huge amount of quality properties that may affect the perception of the received media. First, the media must be properly recorded or captured. Additionally, the media often must be compressed before sending it over a network it to fit the bandwidth of the transport channel Compression often involves lossy processes, which compromise the quality of the media. For video, lossy compression often decreases spatial information, which may result in blocky and blurry image artifacts. Compression also may lower quality in the temporal domain by decreasing the frame rate and dropping frames for video parts that are difficult to encode.

Depending on which transport channel that is used, the transport also may introduce other temporal degradations such as delay and jitter. Delay may be defined as the time from capturing/sending media at a transmitting side to the time it is exposed at a receiving side. Some delay will always be present since all parts in the transport chain will have some amount of duration. For conversational sessions, the delay cannot be too long because users will be annoyed. The amount of delay that an individual user can tolerate may be subjective to an extent, but generally any user will become annoyed after reaching or exceeding a threshold amount (e.g., the International Telecommunications Union Standardization Sector (ITU-T) recommends that a one-way transmission time (end-to-end) delay of voice transmission quality not exceed 400 ms). In a non-conversational session, however, a user may tolerate a greater amount of delay (e.g., delay exceeding 400 ms) if delay would not be considered a critical quality factor within that particular context.

For realtime applications, a sender of media transmits packets in a regular interval and the receiver should play them in the same regular interval. However, in a packet-switched (PS) network, jitter occurs when audio and/or video packets arrive at the receiver at times that vary from an expected or "ideal" position in time. Upon playback, the jitter results in a jerky playback of the video frames or noticeable decrease in voice quality. This type of jitter is sometimes referred to as "delay jitter."

FIGS. 1a and 1b illustrate the concepts of delay and delay jitter in a PS network. In FIG. 1a, an ideal or expected uniform delay $d_1$ occurs for each of packets P1-P5 transmitted from a sender S to a receiver R. This uniformity in delay indicates absence of any delay jitter and the resulting audio or video will be perceived as a smooth playback of the media as originally transmitted. In FIG. 1b, a non-uniform delay $d_2$ for packet P3 and $d_3$ for packet P5 between the sender and receiver indicates presence of jitter because both packets P3 and P5 arrive later than an expected delay, $d_1$. In such a case, the previous frames P2 and P4 would appear "frozen" to an observer of the playback until the arrival of the late packets P3 and P5.

Another form of jitter called "inter-stream jitter" or "skew" is associated with separate streams that pertain to a same application (e.g., voice and video). The inter-stream jitter or skew is a measure of the difference in delay, or an amount that the streams are "out-of-sync" with respect to one another. User perception of good media quality often requires good synchronization (i.e., low skew), such as when watching a person talk, viewing a musical performance etc. Related art within this field is disclosed e.g. in US 2006/0095612, which describes a jitter buffer element, and in US 2005/0226233, which describes trouble-shooting in a VoIP-System, by means of a user configurable jitter buffer size.

SUMMARY

In accordance with embodiments of the invention, a method for selectively controlling a level of buffering of a data stream in a communications device includes receiving an instruction indicating a jitter buffer strategy via a user interface. The communications device sets the jitter buffer strategy based on the indication in the instruction received via the user interface. When the communications device receives a data stream transmitted via a packet-switched network, it buffers the packets contained in the data stream for play out by the device based on the jitter buffer strategy.

Another aspect involves a communications device that includes a jitter buffer, a control unit for controlling buffering performed by the jitter buffer, and a user interface that receives input indicating a jitter buffer strategy and provides an instruction to the control unit to control an amount of buffering of a data stream received from a packet-switched network based on the input.

In other aspects, the communications device receives audio and video data streams associated with a single application, and the selected level of buffering controls a degree of delay between the two voice and video data streams, out-of-synch between the two data streams, and/or delay jitter of at least one of the audio data stream or video data stream.

It is to be understood that both the foregoing general description and the following detailed description are exemplary and exemplary only and are not restrictive of the invention, as claimed.

1.1.1 BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention. In the drawings:

FIGS. 4a and 4b are illustrations of exemplary user interfaces for selecting a jitter buffer strategy in accordance with some embodiments.

1.1.2 DETAILED DESCRIPTION

Figure 1A:
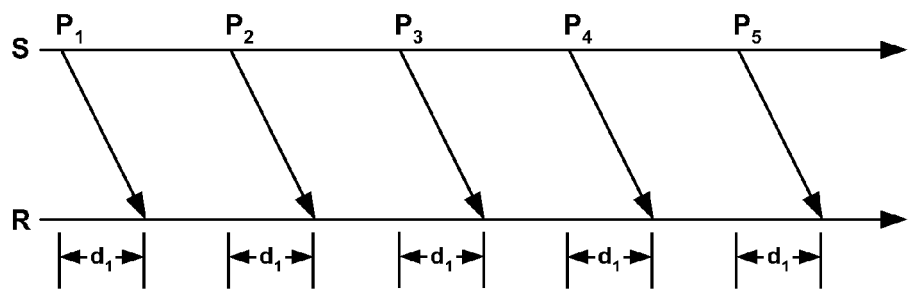
FIGS. 1a and 1b are diagrams illustrating delay and jitter in a packet-based network.
Figure 1B:
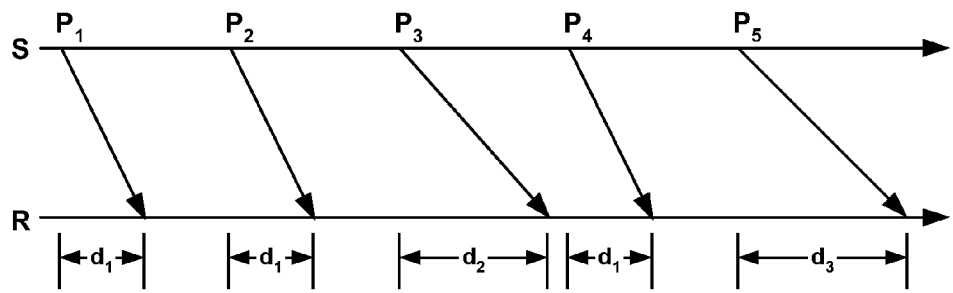

The various aspects are described hereafter in greater detail in connection with a number of exemplary embodiments to facilitate an understanding of the invention. However, the invention should not be construed as being limited to these embodiments. Rather, these embodiments are provided so that the disclosure will be thorough and complete, and will fully convey the scope of the invention to those skilled in the art.

Many aspects of the invention are described in terms of sequences of actions to be performed by elements of a computer system or other hardware capable of executing programmed instructions. It will be recognized that in each of the embodiments, the various actions could be performed by specialized circuits (e.g., discrete logic gates interconnected to perform a specialized function), by program instructions, such as program modules, being executed by one or more processors, or by a combination of both. Moreover, the invention can additionally be considered to be embodied within any form of computer readable carrier, such as solid-state memory, magnetic disk, and optical disk containing an appropriate set of computer instructions, such as program modules, and data structures that would cause a processor to carry out the techniques described herein. A computer-readable medium would include the following: an electrical connection having one or more wires, magnetic disk storage, magnetic cassettes, magnetic tape or other magnetic storage devices, a portable computer diskette, a random access memory (RAM), a read-only memory (ROM), an erasable programmable read-only memory (EPROM or Flash memory), or any other medium capable of storing information. Thus, the various aspects of the invention may be embodied in many different forms, and all such forms are contemplated to be within the scope of the invention.

Furthermore, it should be emphasized that the terms "comprises" and "comprising," when used in this specification, are taken to specify the presence of stated features, integers, steps or components; but the use of these terms does not preclude the presence or addition of one or more other features, integers, steps, components or groups thereof.

Audio-video out-of-synch (i.e., skew) may be viewed with a subjective bias because what one user may consider satisfactory at one level of skew, another user may not. Furthermore, the extent that audio and video can be out-of-synch without affecting a user's perceived quality may depend on any of a number of reasons. For example, the context of the media being transmitted may result in greater or less user tolerance of skew. A user may be less tolerant of out-of-synch audio and video steams while watching a person talk, and therefore desire a short delay between audio and video for good or acceptable lip-synch, but willing to tolerate some, or even a great amount of out-of-synch audio and video while watching a sporting event or nature scene. Some users may simply want the information played out as quickly as it arrives regardless of the resulting amount of jitter and skew.

As long as there is no demand on short delay, a large enough jitter buffer may be used to efficiently remove visible delay jitter. However, a large jitter buffer may not be compatible in contexts in which minimal or short delay would be desired or required, and/or where occasional jitter may be unavoidable. Furthermore, different sizes of jitter buffer may be desired based on the audio and/or video content and the current usage of the service.

The present invention provides a user interface that permits a user to select a level of delay, out-of-synch and/or delay jitter the user finds acceptable for a particular application. The user interface of the present invention allows a user receiving audio and video streams to decide a trade-off between delay, skew and/or delay jitter with a simple control on a receiving unit, such as a receiving unit in a mobile station (e.g., a mobile phone) or fixed computing and/or communications device (e.g., a personal computer (PC) or IP phone). The present invention provides a way to easily select a desired or optimal trade-off between delay, out-of-synch and/or delay jitter for a live service, such as conversational video and/or streaming live content. In some applications in which it would be difficult to specify a desired or optimal jitter buffer strategy in advance, the invention may provide a way to specify a strategy in an "on the fly" manner.

Although not to be considered limited to any particular device or system, the present invention finds particular usefulness in conversational video services that do not use a same transport channel for audio and video data. Such a service, for example, may transmit live video between users over a packet-switched (PS) channel during a regular circuit-switched (CS) call. Since voice data are transmitted over a CS channel, the data are received and played at the receiver in correct order and with fixed delay. However, video packets sent over a PS channel may introduce jitter to the receiver, mainly due to rerouting and/or retransmissions. While the jitter can be removed with a large enough jitter buffer, buffering the video packets also delays the video. Since the CS voice data in this example cannot be delayed, good lip-synch (i.e., good audio video synchronization or low skew) may be difficult to impossible to achieve.

Figure 2:
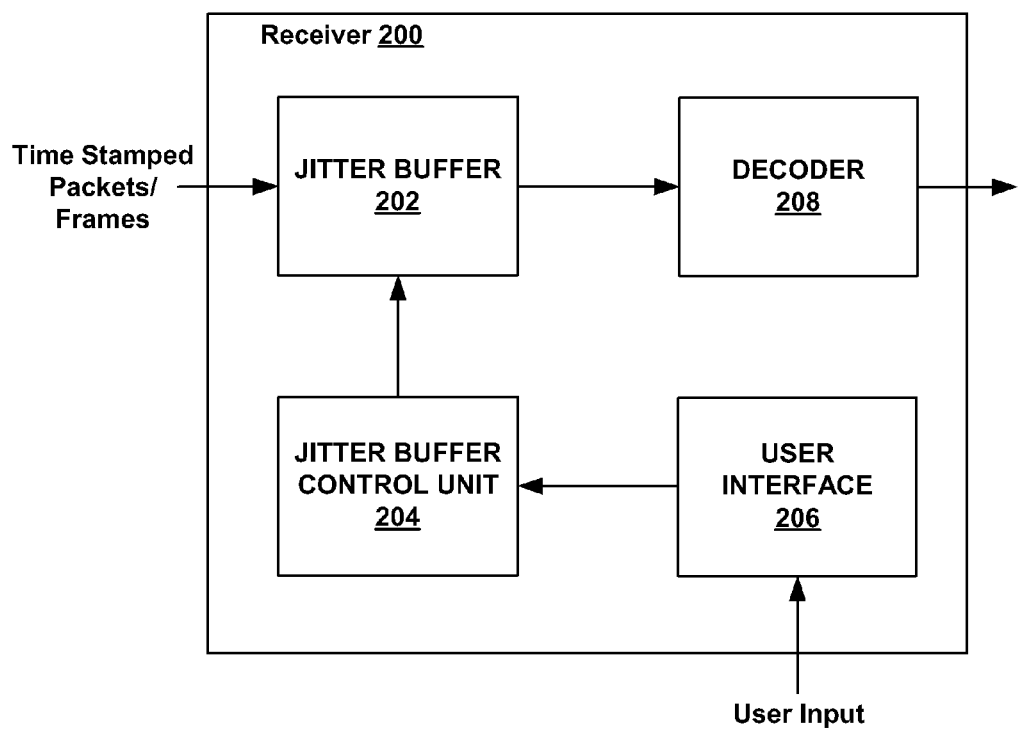
FIG. 2 is block diagram of a receiver including a user interface in accordance with exemplary embodiments.

FIG. 2 shows some components of a receiver 200 of a communications device, which includes a user interface that permits a user to select a level of delay, out-of-synch and/or delay jitter in accordance with some embodiments. The receiver 200 may be included in one or more communications devices communicating with one another, and comprise a jitter buffer 202 that receives time stamped data packets or frames transmitted from another communications device. Data "packets," as used herein, each may contain one or more data "frames" (e.g., audio or video frames). Data packets may also contain partial data frames (i.e., frames may be segmented over several packets). Also, the jitter buffer 202 may store either packets or frames. For example, packets may be "depacketized" before being stored as frames in the jitter buffer 202. Alternatively, the jitter buffer 202 may instead store packets and output frames.

The receiver 200 also includes a jitter buffer control unit 204 that receives an instruction from the user interface 206, which may specify a jitter buffer strategy. For example, a user may utilize the user interface 206 to indicate low delay and good synchronization, and the jitter control unit 204 will set the size of the jitter buffer 202 to buffer minimal or no amount of packets/frames. Conversely, a user may indicate greater delay and smooth motion without jitter removed, and the jitter control unit 204 will set the size of the jitter buffer 202 to buffer a large amount of packets/frames.

The user interface 206 may include a display including a touch screen and/or a Graphical User Interface (GUI), a voice interface, a gesture interface (e.g., sensors for detecting movement of the device or optical interpretation of body movement) or some other known user interface mechanism, any of which may accept input via a pointing device such as a mouse or stylus, a keypad or keyboard, or other device that a user may manipulate to instruct the jitter buffer control unit 204 as desired.

After buffering the incoming media data, the jitter buffer 202 releases the data to the decoder 208, and thereafter the data may be further processed before playback. Although the receiver 200 shown in FIG. 2 has a decoder 208 provided after the jitter buffer 202, it should be appreciated that packets or frames may be decoded before they are stored in the jitter buffer 202.

Through the user interface 206, a user may interact with the receiver to select a jitter buffer strategy, such as a size of the jitter buffer 202 or some other strategy. For example, when short delay and exact synchronization of audio and video is not considered important, the user's selection via the user interface 206 may apply a large jitter buffer for smooth video without jitter. In a similar manner, if a user considers some jitter would be acceptable, the user may make a selection using the user interface 206 that results in applying a minimal jitter buffer or no jitter buffer at all for a short delay and better synchronization of audio and video.

Also, while some embodiments are described herein as including a variable size jitter buffer, the jitter buffer 202 may instead have a fixed size, and the user input may simply control whether the jitter buffer is enabled. Thus, it should be appreciated that a user's selection of a jitter buffer strategy via the user interface 206 may set one or more parameters that may span control of whether or not a jitter buffer is applied (e.g., binary control) to how much granularity of jitter buffer control (e.g., selection from an incremental or continuous scale).

Figure 3A:
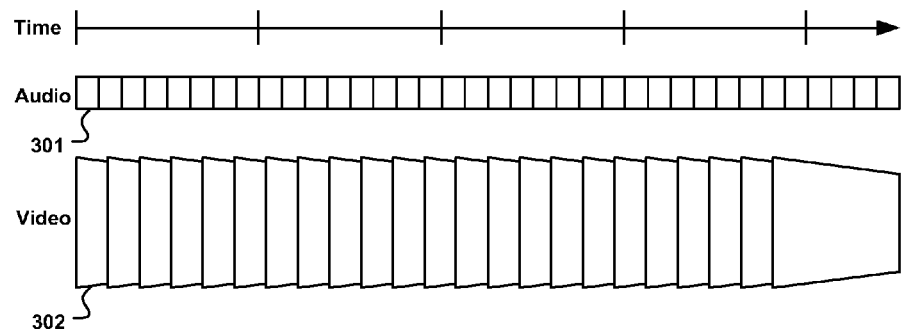
FIG. 3a is a diagram illustrating audio and video media data as captured at a source.
Figure 3B:
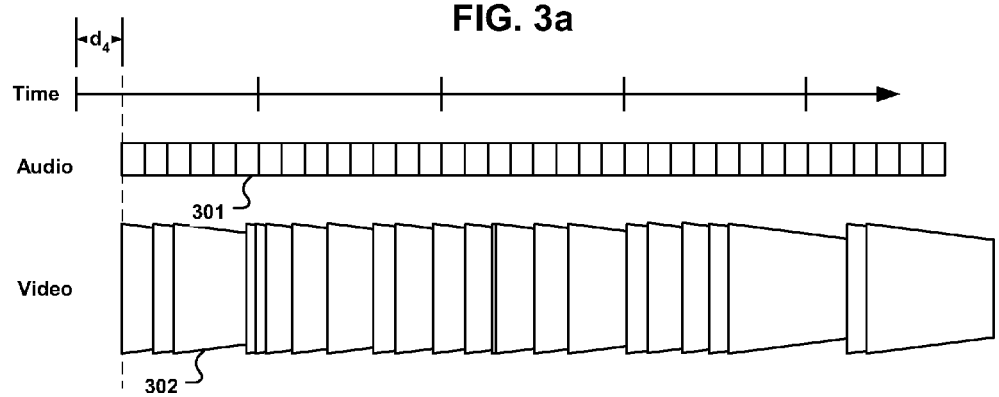
FIG. 3b is a diagram illustrating delay and delay jitter in received audio and video media data at presentation time.
Figure 3C:
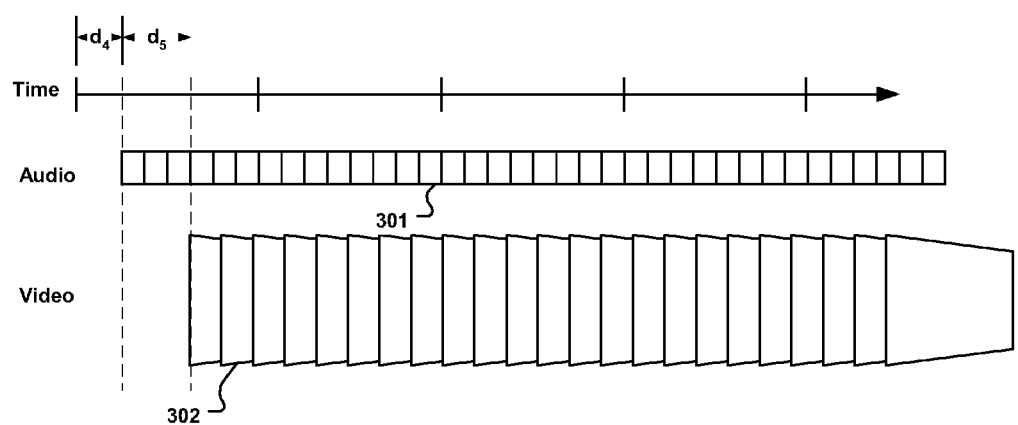
FIG. 3c is a diagram illustrating delay in received audio and video media data at presentation time where delay jitter has been removed from the video media.

FIGS. 3a to 3c illustrate the concepts of delay, delay variation, and how a jitter buffer may be utilized in the context of audio-video media. FIG. 3a shows the audio frames 301 and video frames 302 at the time of capture. The frames 301, 302 are sampled in time in even intervals for smooth playback. Additionally, the packets in each stream may include a timestamp and/or other information indicating the sequence of the frame within the media stream and a relationship to the packet or frame in another application-related stream.

In FIG. 3b, audio and video have been delayed by an amount $d_4$ due to the transmission time. It should be understood that the amount $d_4$ illustrated in FIG. 3b is provided to visually depict concepts of the invention and does not necessarily depict any real amount of delay. Also, the audio and video may be delayed by differing amounts instead of the same amount $d_4$ as shown. In this example, video packets have been transported over a best effort PS channel, which makes the video frames 302 sometimes arrive later than expected and creates delay jitter. The presentation of the video frames 302 reassembled from these packets has a jerky appearance because of these delayed packets.

FIG. 3c shows the results where a large enough jitter buffer has been utilized to remove visible jitter in the video frames 302 received in FIG. 3b. As with the previous examples, the example of FIG. 3c has audio frames 301 transported over a fixed channel in which the audio frames cannot be delayed. While the jitter buffer removes jitter in the received video frames, the video delay is increased relative the audio causing the audio and video to become out-of-synch or skewed.

A jitter buffer can be built in several ways. In its simplest form, it is static and simply delays the playback a certain time. An adaptive jitter buffer, on the other hand, can choose to show frames after a late arriving packet with shorter constant intervals to get a smoother transition to normal state. Packets arriving earlier than expected can also be delayed for a suitable time in the adaptive jitter buffer to get smoother playback. If no jitter is present, the adaptive jitter buffer will not buffer packets. Note, however, that a packet arriving late at the receiving side will always cause a jitter delay that is more or less visible to the user.

In some scenarios, some amount of jitter can be tolerated if good enough synchronization between audio and video is maintained. A typical example of such a scenario is when a user sees another user who is talking during a conversational video call. In this case, a bad lip-synch can be very annoying or otherwise unacceptable.

In other scenarios, the short video delay and good synchronization between audio and video may not be considered important, but a smooth playback is. Take, for example, a sporting event like football. If the curve of the ball is jerky the game will be irritating to follow. In conversational video, the user may also want to show something in the surroundings, like a football game or just a crowd of people, without any jerkiness.

One way to solve this would be to automatically select a jitter buffer strategy that generates the best quality of experience to the user at any given time. However, it is very difficult to detect what type or degree of degradation the user is likely to prefer or consider acceptable because it would depend on the current usage of the service, scene content and personal preferences. The present invention permits the user to decide the trade-off between delay jitter and delay/synchronization (skew), which may be implemented as a control in the receiving device (e.g., a mobile or fixed receiving device).

In some embodiments of the invention, a simple control is included with the receiving device and the user can choose jitter buffer strategy by manipulating a user interface of the control. Because many users may not be aware of the concept of a jitter buffer, a specific "user-friendly" labeling or command may be used. For example, the word "Instant" could be used to indicate low delay and good synchronization with minimal or no jitter buffer, while the word "Smooth" could indicate smooth motion with jitter removed by a large jitter buffer. One can also think of a solution where a continuous scale is used instead of the discrete two-option choice. FIGS. 4a and 4b respectively show exemplary user interfaces for the "Instant" and "Smooth" embodiments. The user interface for user selection may be provided in one or more ways. For example, the options can be hidden in a submenu, displayed as a touch screen, keypad button, or selected via a voice command of the user.

The jitter buffer option does not necessary need to be adjusted in real-time (e.g., while a video is playing). The jitter buffer option can be set when a video call is received. Also, if the user uses a conversational video service in a specific way or have a personal liking of a certain jitter buffer strategy, it could be enough to set this option in advance once and for all. The invention can also be applied on a system where audio and video are both sent over PS traffic, such as for IP-phones. Here it would be possible to delay both audio and video for a trade-off between delay and jitter. Audio and video synchronization could in this case be kept since both audio and video are sent over PS traffic. In PS traffic scenarios where audio and video cannot for some reason be automatically synchronized, a control similar to the one in FIG. 4b could be used to set the synchronization.

Figure 5:
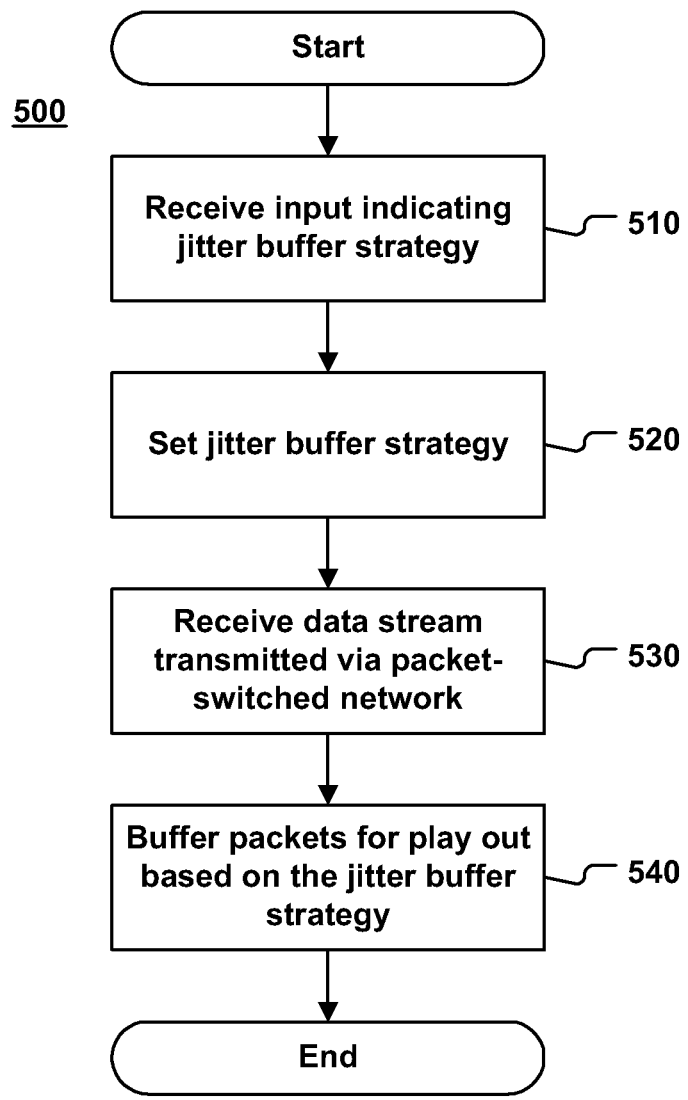
FIG. 5 depicts a flowchart of an exemplary procedure for controlling a level of buffering in a communications device.

FIG. 5 depicts an exemplary procedure 500 for controlling a level of buffering in a communications device. Starting at process 510, the receiver of the communications device receives an input indicating a jitter buffer strategy. For example, the user of the communications device may be receiving a stream of audio video data and manipulate the user interface to input an instruction indicating a desired jitter buffer strategy. At process 520, the receiver sets the jitter buffer strategy based on the indication in the instruction. Process 520 may involve providing a jitter buffer control unit with the instruction, and the control unit setting parameters in the jitter buffer according to the instruction. At process 530, a data stream transmitted via a packet-switched network is received by the receiver; and process 540 buffers the packets contained in the data stream for play out by the communications device based on the input jitter buffer strategy.

The present invention can be applied on any audio-video transmission where video and/or audio delay jitter and skew are present and the optimal choice of jitter buffer strategy is changing over time for various reasons, such as changing content or usage of service. In addition, the present invention is in no way limited to mobile usage. The same concept described above can be used in, for example, a PC environment, where an audio-video conversation is taking place between two PC-clients or between a PC-client and a mobile device. It is also possible to use the present invention in a scenario including fixed network telephony with video sharing where audio is sent over CS or PS traffic and video over PS traffic.

The present invention has significant advantages over current implementations. For example, in an audio video conversational service where video jitters, it is not always clear in advance which jitter buffer strategy should be used. A video jitter buffer removing most or all jitter adds extra delay to the video, which may also cause audio and video to get out-of-synch. Depending on the current usage of the service, different jitter buffer approaches may be preferred. The present invention allows the user to manually select jitter buffer strategy. By doing so, the most annoying jitter, delay and out-of-synch problems can be minimized for each separate occasion.

It will be apparent to those skilled in the art that various changes and modifications can be made in the delay, jitter, and skew management method and configuration of the present invention without departing from the scope thereof. Thus, it is intended that the present invention cover the modifications of this invention provided they come within the scope of the appended claims and their equivalents.

What is claimed is:

1. A method for improving communication in a communications device, comprising:
   presenting a user interface, on a touch screen of the communications device, for receiving a jitter buffer strategy selection input after the communications device begins communication with another communications device, wherein the user interface presents an incremental or continuous scale to allow a user to indicate a preference for low delay, good synchronization, and smooth motion based on the user selected position on the incremental or continuous scale;
   generating an instruction, based on the user selected preference, said instruction indicating a jitter buffer strategy that defines a trade-off between delay, skew, and delay jitter;
   setting the jitter buffer strategy based on said indication in the instruction, wherein the trade-off between delay, skew, and delay jitter is varied according to the instruction;
   receiving a video data stream transmitted via a packet-switched network and an audio data stream associated with the video data stream; and
   buffering packets contained in the video data stream for play out by the communications device based on the jitter buffer strategy, wherein the jitter buffer strategy controls the trade-off between a degree of delay of the video data stream, delay jitter of the video data stream, and a skew between the audio data stream and the video data stream based on the user indicated preference for one of low delay, good synchronization, and smooth motion.

2. The method according to claim 1, wherein the audio data stream is transmitted via a circuit switched network.

3. The method according to claim 1, wherein the instruction is based on input received via interaction with the user interface of the communications device.

4. The method according to claim 1, wherein the user interface comprises one or more of a touch display, a keypad, a keyboard and a microphone.

5. The method according to claim 1, wherein the indication is one of a binary setting, an incremental setting and a value of a continuous scale of selectable settings.

6. The method according to claim 1, wherein the instruction further indicates a size of a jitter buffer to use for said buffering of the packets in accordance with the jitter buffer strategy.

7. A communications device, comprising:
   a jitter buffer;
   a control unit for controlling the jitter buffer; and
   a user interface presented on a touch screen of the communications device for receiving input indicating a jitter buffer strategy and providing an instruction to the control unit to control the jitter buffer buffering a data stream received from a packet-switched network based on the jitter buffer strategy that defines a trade-off between delay, skew, and delay jitter, wherein the user interface is configured for presentation of a jitter buffer strategy selection input after the communications device begins communication with another communications device, wherein the user interface presents an incremental or continuous scale to allow a user to indicate a preference for low delay, good synchronization, and smooth motion based on the user selected position on the incremental or continuous scale, wherein the trade-off between delay, skew, and delay jitter is varied by setting parameters according to the instruction, wherein the data stream is a video data stream and an audio data stream is associated with the video data stream, and wherein the jitter buffer strategy controls a trade-off between a degree of delay of the video data streams, delay jitter of the video data streams, and a skew between the audio data stream and the video data stream based on the user indicated preference for one of low delay, good synchronization, and smooth motion.

8. The device according to claim 7, wherein the audio data stream is configured for transmission via a circuit switched network.

9. The device according to claim 7, wherein the user interface comprises one or more of a touch display, a keypad, a keyboard and a microphone.

10. The device according to claim 7, wherein the indication is one of a binary setting, an incremental setting, and a value of a continuous scale of selectable settings.

11. The device according to claim 7, wherein the instruction indicates a size of the jitter buffer.

* * * * *